Patented Nov. 7, 1950

2,529,448

UNITED STATES PATENT OFFICE 2,529,448

PURIFICATION OF PHTHALIC ANHYDRIDE

Courtney Conover, Silver Spring, Md., assignor to Monsanto Chemical Company, St. Louis, Mo., a corporation of Delaware No Drawing. Application January 18, 1949, Serial No. 71,549

4 Claims. (Cl. 202—57)

This invention relates to an improved method of purifying crude phthalic anhydride and particularly those crude phthalic anhydrides which have been prepared by the vapor phase catalytic oxidation of naphthalene; more particularly it relates to the preparation of a purified phthalic anhydride which is especially adapted for the manufacture of exceptionally high quality phthalic anhydride derivatives.

Crude phthalic anhydride and particularly those which have been prepared by the vapor phase catalytic oxidation of naphthalene, substituted naphthalene, or ortho-xylene generally contain varying quantities of impurities which impart disagreeable, often foul smelling, odors thereto. The problem of separating phthalic anhydride from such impurities is particularly difficult in commercial operations since the quantities and nature of the impurities vary considerably from batch to batch and from day to day. The methods and processes of purifying such crude phthalic anhydride as suggested heretofore, are successful with certain crudes but have not been generally successful for the purification of all types of crudes since certain quantities and types of impurities are not amenable to treatment by such prior methods and are carried over with phthalic anhydride when it is distilled from the treated crude.

Sulfuric anhydride substances, such as sulfuric acid and oleum, have been found to be especially active as purifying agents for phthalic anhydride and have been repeatedly recommended and used in such a process. These materials, however, possess a serious disadvantage in that after purification, small amounts of the sulfuric anhydride substances are carried over with the phthalic anhydride vapors into the distilled product. Since some applications require the use of especially pure phthalic anhydride, the presence of small amounts of sulfur containing materials renders the phthalic anhydride unsuitable for use in such specialty applications. Typical of such specialty applications is the preparation of certain synthetic resins wherein phthalic anhydride of the highest degree of purity is a necessity. Heretofore, it has been the procedure to obtain phthalic anhydride of the highest degree of purity and free from sulfur containing substances to further treat phthalic anhydride which has been subjected to sulfuric anhydride purification with a second purification agent for the purpose of decomposing the sulfuric anhydride impurities which were introduced by the prior sulfuric anhydride treatment.

One object of this invention is to provide a simple and efficient method of purifying all types of crude phthalic anhydride.

A further object of this invention is to provide an improved method for the purification of phthalic anhydride by means of a purification agent which is not carried over into the distilled product and consequently need not itself be removed by a subsequent purification treatment.

Still further objects and advantages of the invention will appear in the description and the claims.

The invention is practiced in general by subjecting crude phthalic anhydride to a chemical treatment at relatively high temperature and then physically separating the phthalic anhydride from the impurities in purified form in a suitable manner. This chemical treatment is generally carried out by heating a mixture of crude phthalic anhydride and a small proportion of sulfamic acid. The mixture is generally heated at a temperature essentially above 270° C., but preferably not substantially in excess of the boiling point of phthalic anhydride at atmospheric pressure and without appreciable loss of phthalic anhydride vapor and preferably for a period of time sufficient to substantially complete the reaction between such agent and the impurities in the crude. This treatment is generally of such duration as to materially alter the volatility of the impurity to the extent that phthalic anhydride can be distilled therefrom without a carrying over of the impurity with the phthalic anhydride vapor. The purified phthalic anhydride is then separated from the mixture as by fractional distillation at subatmospheric pressure.

Various types of crude phthalic anhydride may be purified according to the method described herein. As examples of these may be mentioned phthalic anhydride which has been prepared by the vapor phase catalytic oxidation of naphthalene, substituted naphthalenes, ortho-xylene, and the like. The purification method described herein can also be practiced on semi-refined crudes, that is, crudes which have been given one or more antecedent distillations.

The quantity of sulfamic acid employed, the duration of the treatment and the temperature employed in the treatment are to a certain extent dependent on each other and are generally dependent upon the source of the crude and the quantities and nature of the impurities in the crude. In general, the quantity of sulfamic acid required will depend also on whether the phthalic anhydride which is to be purified, is a crude as such or whether it has been semi-refined by one or more precedent distillations.

In general, it is desirable in the treatment of most crudes to employ sulfamic acid in the amount of about 2 percent by weight of the crude. The quantity of sulfamic acid utilized may however be varied within the range of about 1 to about 5 percent by weight of the crude depending upon the amount of impurities present in the crude. When the crude contains less than the normal quantities of impurities, it is possible to employ lesser amounts of sulfamic acid. On the other hand, when purifying crudes that contain larger amounts of impurities than the normal crude, it may be necessary to employ larger quantities of such agent. In this purification treatment of any particular crude phthalic anhydride, it is preferable to employ a quantity of sulfamic acid which is substantially equivalent to that required to eliminate all the impurities in the crude without being excessive. When more sulfamic acid agent is employed than is required to eliminate the impurities, the excess of unreacted sulfamic acid is not generally harmful or detrimental per se in respect to the phthalic anhydride. However, the distillant or residue which is obtained on distillation of the phthalic anhydride may be viscous or difficult to distill and separation of the remaining phthalic anhydride therefrom may be extremely difficult.

The temperate at which such purification treatment is carried out is above about 270° C. and preferably at the boiling point of phthalic anhydride at atmospheric pressure. The treatment is generally completed after heating at such temperatures for a period of about 6 hours although a longer time of treatment may be used, if desired. Preferably the treatment is carried out at a temperature described for a period of time sufficient to substantially complete the reaction between such purifying agent and the impurities in the crude.

Further understandings of the practice and advantages of the invention can be obtained from the following specific examples, which are intended to be illustrative and not limitive of the scope of the invention; percentages being by weight unless otherwise specified.

Example I

Ten grams of sulfamic acid was added to 500 grams of molten crude phthalic anhydride which was prepared by the vapor phase catalytic oxidation of naphthalene. The resultant mixture was then heated under reflux to a temperature of 285° C. for a period of 4 hours. This treated crude was then submitted to a fractionation through an 8 theoretical plate column, removing a forerun of approximately 10% by weight of the composition at a reflux ratio of 10–1. The main fraction, which amounted to approximately 80% by weight of the total composition, was then removed at a reflux ratio of 1–1. This main fraction was free from odor. A quantitative chemical analysis of this material indicated a sulfur content of less than 0.0001%. Further purification was unnecessary and the thus purified phthalic anhydride was suitable for immediate use for the preparation of high quality synthetic resins.

Example II

Two percent by weight of sulfamic acid was added to semi-refined phthalic anhydride which had been prepared by the vapor phase catalytic oxidation of naphthalene and the crude so obtained distilled without fractionation. This mixture was then heated under reflux to a temperature of 285° C. for a period of 6 hours after which phthalic anhydride was fractionated therefrom in a manner similar to that described in Example I. The main fraction possessed no odor and had a sulfur content of less than 0.0001%.

Example III

To 500 grams of crude phthalic anhydride obtained by the vapor phase catalytic oxidation of naphthalene, and similar to that used in Example I, was added 10 grams of 20% oleum. The resultant mixture was heated under reflux to a temperature of 285° C. for a period of 6 hours, after which the phthalic anhydride was fractionated therefrom in the manner described in Example I. The main fraction possessed no odor but contained sulfur as a result of some of the oleum being carried over in the fractionation and consequently the main fraction had to be subjected to further purification with charcoal, according to methods well known to those skilled in the art, in order to remove the sulfur containing materials and render the phthalic anhydride suitable for use in specialty applications.

Example IV

Two percent by weight of 20% oleum was added to semi-refined phthalic anhydride which had been prepared by the vapor phase catalytic oxidation of naphthalene which was similar to that used in Example I, and distilled without fractionation. The resultant mixture was heated under reflux to a temperature of 285° C. for a period of 6 hours after which phthalic anhydride was fractionated therefrom in the manner described in Example I. The main fraction possessed no odor but contained sulfur as a result of some of the oleum being carried over in the fractionation and consequently the main fraction had to be subjected to further purification with charcoal, according to methods well known to those skilled in the art, in order to remove the sulfur containing materials and render the phthalic anhydride suitable for use in specialty applications.

Example V

Five percent by weight of sulfamic acid was added to crude phthalic anhydride which had been prepared by the vapor phase catalytic oxidation of ortho-xylene. The resultant mixture was then heated under reflux at a temperature of 285° C. for a period of 4 hours after which phthalic anhydride was distilled therefrom in the manner described in Example I. The main fraction possessed no odor and quantitative analysis revealed the sulfur content to be less than 0.0001%. The thus purified phthalic anhydride was therefore of sufficient purity to be used without further purification in those specialty applications requiring phthalic anhydride with the highest degree of purity.

I claim:

1. A method of purifying crude phthalic anhydride which comprises heating a mixture of said crude phthalic anhydride in the presence of sulfamic acid at a temperature essentially above 270° C. for a period of time sufficient to permit separation of phthalic anhydride from the impurities therein by distillation; and then distilling phthalic anhydride therefrom in purified form.

2. A method of purifying phthalic anhydride which comprises heating a mixture of said phthalic anhydride and from 1 percent to 5 percent by weight of sulfamic acid at a temperature essentially above 270° C. for a period of time sufficient to permit separation of phthalic anhydride from the impurities therein by distillation; and then distilling phthalic anhydride therefrom in purified form.

3. In the process for the purification of phthalic anhydride, the step comprising heating said phthalic anhydride in the presence of sulfamic acid at a temperature essentially above 270° C. for a period of time sufficient to permit separation of phthalic anhydride from the impurities by distillation.

4. In the process for the purification of phthalic anhydride, the step comprising heating a mixture of said phthalic anhydride and from 1 percent to 5 percent by weight of sulfamic acid at a temperature essentially above 270° C. for a period of time sufficient to permit separation of phthalic anhydride from the impurities by distillation.

COURTNEY CONOVER.

REFERENCES CITED

The following references are of record in the file of this patent:

UNITED STATES PATENTS

| Number | Name | Date |
| --- | --- | --- |
| 1,817,304 | Foster | Aug. 4, 1931 |
| 1,897,110 | Bowers | Feb. 14, 1933 |
| 2,105,911 | Foster | Jan. 18, 1938 |
| 2,356,449 | Engel | Aug. 22, 1944 |